United States Patent [19]
Hsu

[11] Patent Number: 6,041,694
[45] Date of Patent: Mar. 28, 2000

[54] OVEN WITH MULTIPLE ROAST PANS

[75] Inventor: Tony Hsu, Yung Kang, Taiwan

[73] Assignee: Lundar Electric Inductrial Co., Ltd., Tainan Hsien, Taiwan

[21] Appl. No.: 09/225,711

[22] Filed: Jan. 6, 1999

[51] Int. Cl.[7] .............................. A47J 27/00; A47J 37/00
[52] U.S. Cl. .................. 99/427; 99/340; 99/448; 99/443 R; 126/21 A; 219/400; 219/754
[58] Field of Search ............................ 99/339, 340, 353, 99/385, 389, 391, 426, 427, 443 R, 443 C, 448; 126/21 A, 9 R; 219/400, 685, 754, 757; 108/20, 39

[56] References Cited

U.S. PATENT DOCUMENTS

| | | | |
|---|---|---|---|
| 1,844,347 | 2/1932 | Chapman | 99/446 X |
| 2,438,699 | 3/1948 | Groetchen | 99/446 X |
| 4,114,523 | 9/1978 | Eff | 99/340 X |
| 4,450,758 | 5/1984 | Belinkoff et al. | 99/427 X |
| 5,109,758 | 5/1992 | Voegtlin | 99/443 C |
| 5,134,927 | 8/1992 | McCarthy, III et al. | 219/400 |
| 5,339,726 | 8/1994 | Poulson | 126/21 A |
| 5,552,585 | 9/1996 | Fleck et al. | 99/448 X |
| 5,590,584 | 1/1997 | Ahn | 99/427 |
| 5,644,977 | 7/1997 | Rodriguez | 99/443 R |
| 5,845,563 | 12/1998 | Haring et al. | 99/427 X |
| 5,855,164 | 1/1999 | Chiang | 99/427 X |
| 5,865,098 | 2/1999 | Anelli | 99/448 X |

*Primary Examiner*—Timothy Simone
*Attorney, Agent, or Firm*—Rosenberg, Klein & Lee

[57] ABSTRACT

An oven with multiple pans is composed of a base, a base plate, rotating frames and roast pans, the base includes a motor which extends its spindle upwardly through the base plate linked with a transmission gear, the base plate having a plural recesses around the motor with a centrally formed shaft extending therefrom for accommodating a spindle of roast pans therein. The roast pans comprise gears at the edges to be meshed with the transmission gear and activated by the motor to rotate.

3 Claims, 3 Drawing Sheets

OVEN WITH MULTIPLE ROAST PANS

FIELD OF THE INVENTION

This invention relates to an oven with multiple roast pans and more particularly to an oven which drives more than one roast pan in one time.

BACKGROUND OF THE INVENTION

The conventional oven has a design that the pan is fixed within the oven which often requires users to rotate the food on the pan in order to have an evenly cooking and also to prevent over cooking. This may cause users to get burns when their hands touched the pan accidentally. A rotating pan oven is therefore invented which includes a motor mounted in the base of the oven to drive the roast pan to spin so as to receive an evenly roasted food.

A new designed standing oven has a few electric wires embedded in the base and the pan is rotated by a motor. However, the design can only bake one food at a time, if a lot of food need to be served, it will take more times.

OBJECTS OF THE INVENTION

It is the primary object of the present invention to provide an oven with multiple roast pans which is able to cook or bake more than one food at a time.

It is another object of the present invention to provide an oven with multiple roast pans which saves time and energy.

It is a further object of the present invention to provide an oven with multiple roast pans which is cost effectiveness.

DETAILED DESCRIPTION OF THE PREFERRED EMBODIMENT

Figure 1:
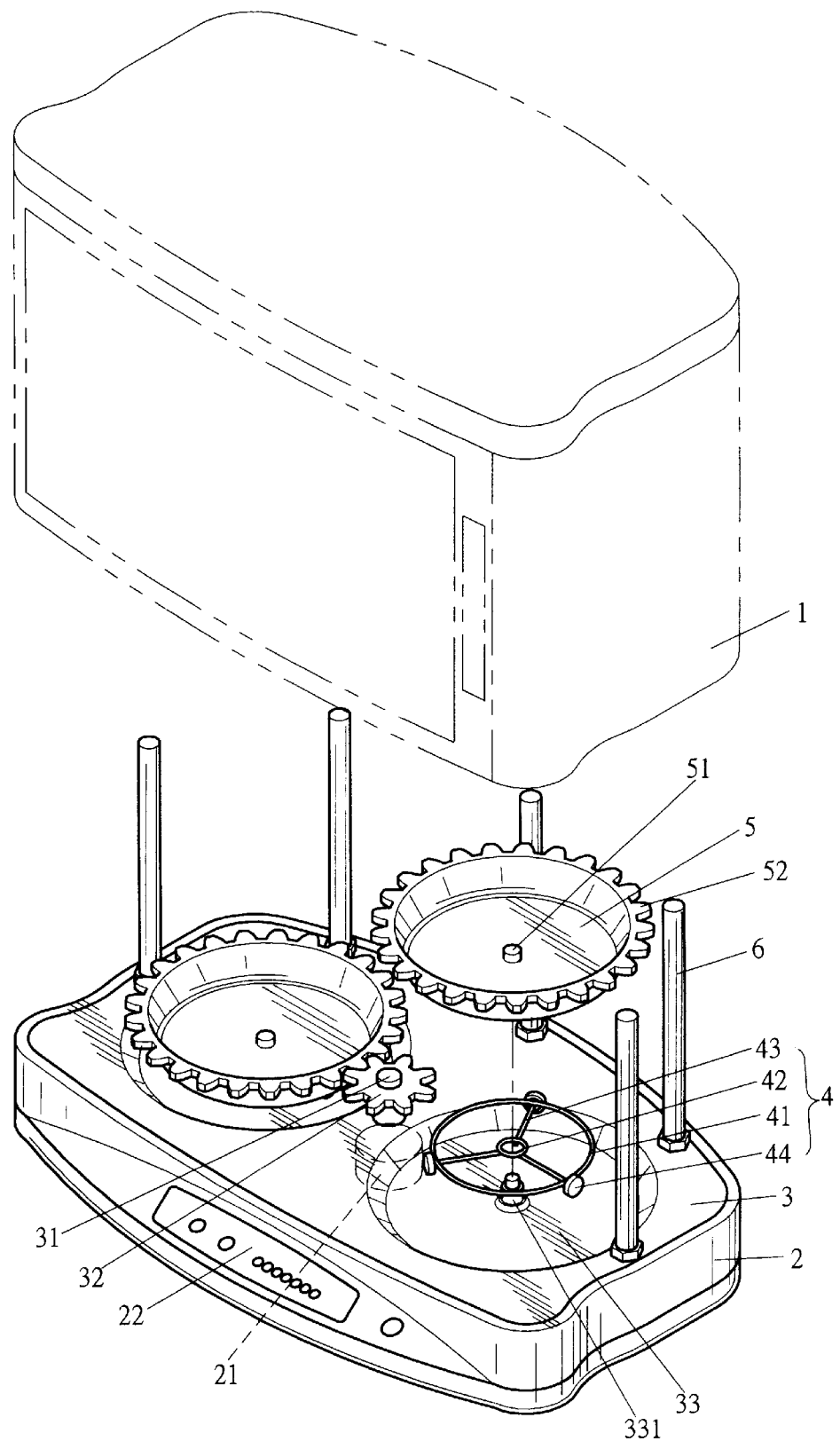
FIG. 1 is a perspective view of an oven incorporated with the new design of the present invention.
Figure 2:
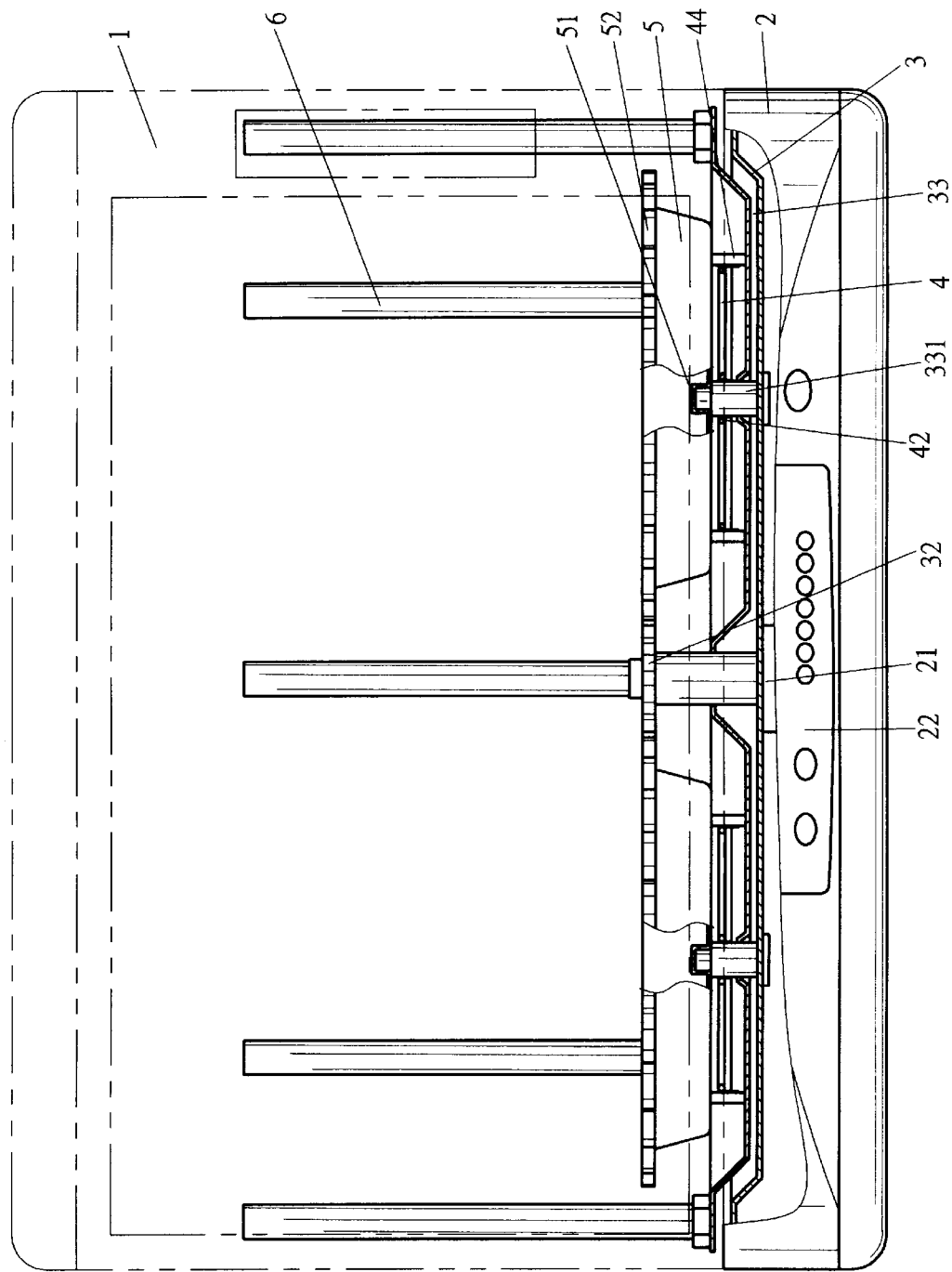
FIG. 2 is a side cross sectional view of FIG. 1.
Figure 3:
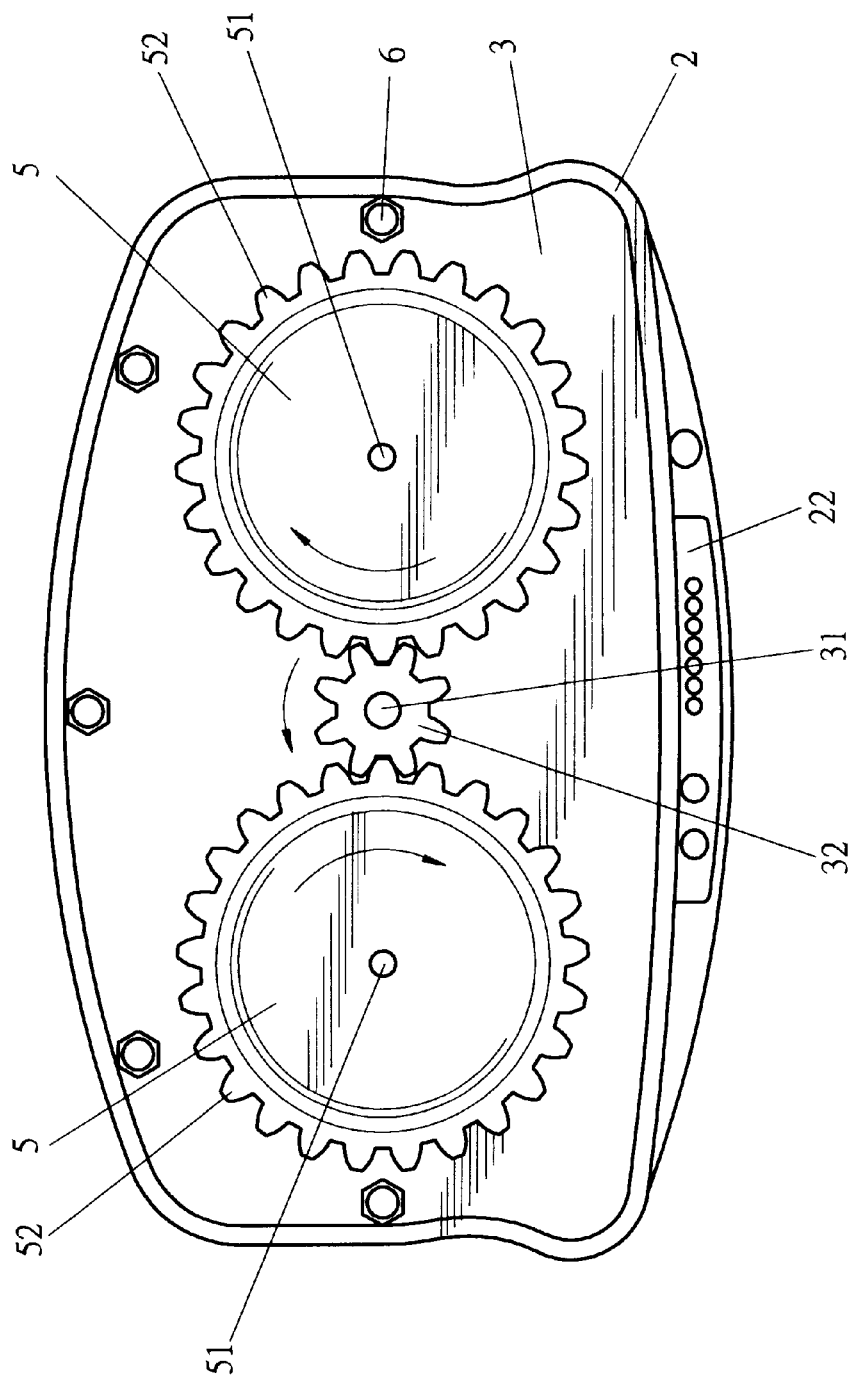
FIG. 3 is a top plan view of FIG. 1.

Referring to FIG. 1 of the present invention which includes a case 1, a base 2 covered by a base plate 3, rotating frames 4, roasting pans 5 and electric heating elements 6, wherein a motor 21 is placed in the base 2 and a control unit 22 is at the front end of the base 2.

The base plate 3 has a spindle 31 extending upwardly and mounted with a transmission gear 32 on the top end of the base 2, the base plate 3 has further a pair of recesses 33 at respective sides corresponding to the spindle 31 with a shaft 331 extending upwardly from the center of the recesses 33 respectively, the recesses 33 are adapted to seat with a rotating frames 4 and roast pans 5, respectively. A plural electric heating elements 6 are formed around the base plate 3.

The rotating frame 4 has a small circular body 42 with a plural ribs 43 extending outwardly to connect with a larger circular body 41, and a plural wheels 44 secured at the larger circular body 41 for rotating purpose.

The roast pan 5 is a disc having a boss 51 extending from the center portion and gears 52 at the edge adapted to be meshed with the transmission gear 32.

To assemble, seat the rotating frame 4 on the recess 33 with the shaft 331 extending through the small circular body 42, then place the roast pan 5 on the top of the rotating frame 4 with the boss 51 sleeved on the shaft 331 and the gears 52 meshing with the transmission gear 32. Thus, when the motor is activated, the spindle 31 will link the two pans 5 to spin simultaneously.

While there has been described and illustrated one specific embodiment of the invention, it will be clear that variations in the details of the embodiment specifically illustrated and described, such as extra roast pans, may be made without departing from the true spirit and scope of the invention as defined in the appended claims.

I claim:

1. An oven with multiple roast pans comprising a case, a base, a base plate, at least one rotating frame and corresponding roast pan, wherein said base comprising a motor seating therein with a spindle extending upwardly and through said base plate and secured with a transmission gear at the top end of said spindle, said roast pan comprising gears surrounding the edge to be meshed with said transmission gear.

2. The oven with multiple roast pans, as recited in claim 1, wherein said base plate having a boss extending centrally corresponding to a shaft extending from the center of said recess.

3. The oven with multiple roast pans, as recited in claims 1, wherein a rotating frame being used in between said recess of said base plate and said roast pan, wherein said rotating frame having a small circular body at center portion with at least two ribs connected to the edge and extending outwardly to connect to a larger circular body, and at least two wheels being secured to the edge of said larger circular body.

* * * * *